Aug. 14, 1956  S. D. ROSS  2,759,132
ELECTROLYTIC CAPACITOR
Filed May 12, 1952
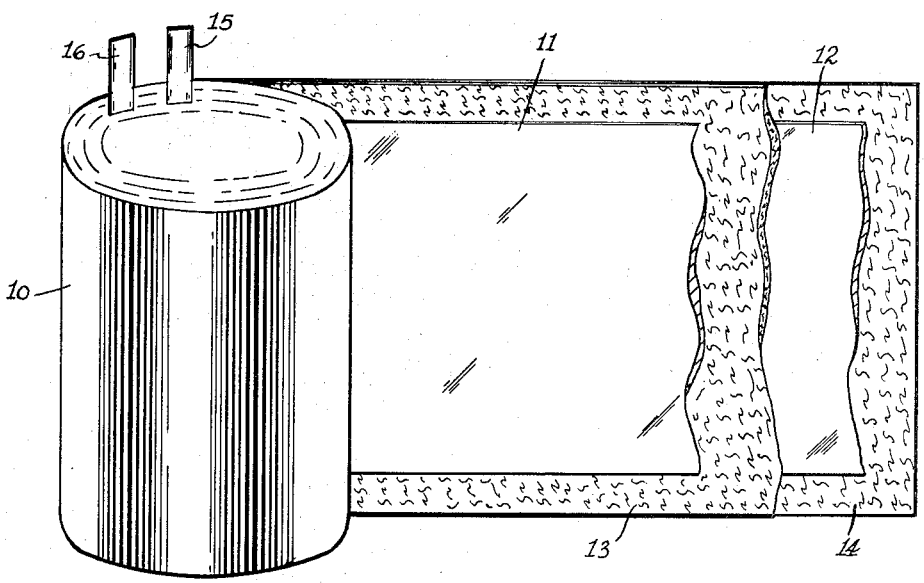
SIDNEY D. ROSS
INVENTOR.
BY *Connolly and Hatz*
HIS ATTORNEYS

United States Patent Office 2,759,132
Patented Aug. 14, 1956

2,759,132
ELECTROLYTIC CAPACITOR

Sidney D. Ross, Williamstown, Mass., assignor to Sprague Electric Company, a corporation of Massachusetts Application May 12, 1952, Serial No. 287,316

5 Claims. (Cl. 317—230)

This invention relates to improved electrolyte systems and more particularly refers to non-aqueous electrolytes for electrolytic devices such as capacitors.

The electrolytic capacitor has been the subject of extended research and large scale use during the last half century. Most capacitors of this type have been made with anodes consisting of formed aluminum. Electrolytes have been selected from numerous categories and the patent and technical literature abounds with suggested ionogens as well as solvents therefor. Despite the multitude of electrolytes which have been disclosed, most electrolytic capacitors employ relatively simple systems containing boric acid or a borate dissolved in a suitable material such as water or ethylene glycol. The so-called dry electrolyte contains only small amounts of free water.

While the electrolytes of the type referred to above are quite suitable for many capacitor applications they are unsatisfactory for use in capacitors to be subjected to extreme high or low temperatures and other special operating conditions. This deficiency has become most apparent with the development of associated electrical equipment suited for and requiring high ambient temperatures. Tantalum anodes have become of technical importance as replacements for aluminum anodes because of the greater stability of the formed oxide film. Very simple tantalum capacitors suitable for operation at temperatures more or less above 100° C. have been produced using sulfuric acid as the electrolyte. While sulfuric acid is suitable from a conductivity standpoint, its use introduced additional and serious problems in selection of structural materials, sealing, venting arrangements and the like, particularly since it is a liquid.

It is an object of the present invention to overcome the foregoing and related disadvantages. A further object is to produce new and useful electrolyte systems for electrolytic capacitors and other related devices. A further object is to produce a new and useful high temperature electrolytic capacitor. Additional objects will become apparent from the following descriptions and claims.

These objects are attained in accordance with the invention wherein there is produced an electrolyte system comprising an organic salt whose anion is selected from the class containing aromatic ions with at least one oxidizing group, said anions having the ability to oxidize anodic metal surfaces, dissolved in a solvent.

In one of its limited embodiments the invention is concerned with a non-aqueous electrolyte system comprising an organic salt whose anion is the picrate anion and whose cation is a quaternary hydroxy substituted alkyl amine, said salt being dissolved in a polyhydroxy aliphatic compound.

According to my invention I have found that a special type of electrolyte material introduced into a special solvent system can be used as an electrolyte for many types of electrolytic capacitors and other devices in which prior electrolyte systems were unsatisfactory. In particular, my electrolytes show unusual stability at temperatures on the order of 200° C. without at the same time being unsatisfactory for normal operation, as for example, at room temperature.

What I have discovered is that the ionic electrolyte constituent should consist of an organic salt with a particular type of anion. While I am not fully aware of the reasons therefor, it appears that this anion should possess three characteristics.

First, the anion must be an oxidizing agent, thus acting to reform or heal the oxide film on the anode metal if this be of the so-called valve metal type. These organic anions should possess oxidizing action, which means that the anion should have a nitro, nitroso or other substituent which will be active in the initial formation or in subsequent reformation of the anode oxide film.

Second, the anion should be of a type which will be absorbed on the anode surface, that is, it should migrate to and form a boundary layer on the metal surface, thus being available for its desired function at any time during the operation of the device. Further, it may act as a pore filling material in the oxide film and contribute to the overall insulating properties of the film.

Third, for optimum stability of the electrolytic capacitor the anion must react with the initial products associated with corrosion or degradation of the protective oxide film on the metal. Such degradation as results in the formation of free radicals is thus immediately terminated before reaching secondary or advanced stages. Therefore, the accidental presence of a chloride ion, for example, normally most destructive to an aluminum anode, will not result in advanced deterioration and corrosion, if the proper electrolyte anion is present.

Following the definition indicated above it is possible to select a number of anions which will perform the desired function. Among these are the following:

Picrate
Di-nitro phenolate
Nitro phenolate
Nitro-phenyl mercaptate
Dinitrophenyl mercaptate
Phenyl-dinitro-phenolate
Dinitro-beta-naphtholate
The nitroso and azoxy homologues of the above The picrate anion is preferred because of its availability, but the other anions are also effective when used in accordance with my invention.

The cation may be selected from any one of a number of classes including inorganic cations. Among the inorganic ions are sodium, calcium, potassium and lithium, the latter being a preferred cation. Among the organic cations the amines generally are useful, but for most purposes the hydroxy substituted alkyl amines are desired. The preferred class of cations includes the quaternary amines, especially hydroxy substituted forms, such as the tetra-ethanol ammonium cation.

The solvents which may be employed in accordance with my invention are extremely varied, including for certain limited applications, aqueous systems. It is ordinarily preferred to employ a non-aqueous polar solvent system selected on the basis of the electrolyte salt solubility characteristics. In instances where the salt cation is selected from the hydroxy alkyl amine series, the glycol family is suitable. Di-ethylene glycol, tri-ethylene glycol and higher derivatives are preferred. In some cases esters form effective solvents and can be used with success. It should be noted that the solvent need not be a liquid per se under the operating conditions of the device. It is possible to produce solid and even plastic electrolyte systems employing, for example, polyethylene glycols of relatively high molecular weight, polyvinyl alcohol, polyvinyl acetate and the like, as solvent or as modifiers for other solvents.

Because of the use of salts in my electrolytes I find that the conductivity is relatively high even at moderate concentrations of salt in the system, also permitting simple control of the system conductivity. Ordinarily the molar concentration of salt is varied from about .001 to about 1, the particular value depending upon the temperature and the other known conditions.

It is also possible to employ the salt electrolyte systems of my invention in the initial formation of the oxide film on the so-called valve metal. My electrolytes are characterized by a high sparking potential making them useful for high voltage formations.

The type of anode metal used will of course depend upon the nature of the final application. Aluminum and tantalum have both been successfully used as anode metals in high temperature electrolytic capacitors of my invention. However, other valve metals such as titanium, zirconium, magnesium and bismuth may be employed where their particular anodic characteristics are of interest.

Reference is made to the appending drawing in which 10 represents a capacitor roll, partially unwound. 11 is the anode of the capacitor, and consists of a so-called valve metal, such as aluminum, tantalum, titanium and zirconium with a corresponding oxide film formed on the surface thereof. The cathode 12 is usually also of a valve metal, but for direct current applications, may be of silver or other metal foil. The anode and/or cathode may be etched, perforated, sprayed or otherwise modified before formation to increase the effective surface area. 13 and 14 represent porous spacers, such as glass cloth, cellulose paper, perforated polytetrafluoroethylene or other material inert in the electrochemical system, impregnated with an electrolyte of my invention. Tabs 15 and 16 are connected to the two electrode foils for termination purposes.

The housing for the capacitor may consist of a metal or non-metal container such as aluminum or silver and glass, respectively. Conventional sealing means may be employed, the exact nature depending upon the temperature range to be encountered, upon the viscosity of the electrolyte, etc.

In addition to the rolled capacitor illustrated, the invention is applicable to sintered porous anodes, rod and wire anodes, etc. for special purposes.

Where the capacitor is to be operated on alternating current, both electrodes are formed, in the usual manner. The forming electrolyte used to produce the oxide film may conform to the type described herein, or may be a conventional, normally aqueous electrolyte, such as boric or phosphoric acid solutions.

Where the electrolyte salt is dissolved in a resinous material, such as polyvinyl alcohol, a self supporting electrolyte is produced, and the need for a porous spacer is avoided. Further, such resinous or plastic electrolytes can be molded against the electrodes.

In addition to the application of the electrolytes to electrolytic capacitor systems, they may be used in rectifiers, batteries and other systems where their characteristics are of importance.

The following examples of the preparation of electrolyte and electrolytic capacitors further illustrate the practice of my invention.

*Example 1*

The picrate salt of tri-isopropanolamine was prepared by dissolving one mol of picric acid and one mole of tri-isopropanolamine in separate portions of absolute alcohol. Each solution was heated to boiling and then mixed with the resulting mixture maintained for one half hour at a warm temperature, approximately 35–45° C. The solvent was removed leaving an oily substance. The residue was taken up in a minimum of hot absolute alcohol and crystallized by cooling. After a further recrystallization the purified salt was in the form of yellow crystals with a melting point of 129–131° C.

*Example 2*

The picrate salt of triethanolamine was prepared by dissolving one mol of picric acid and one mol of triethanolamine in separate portions of absolute alcohol and carrying out the reaction in the procedure set forth in Example 1. The recrystallized product was yellow needles with a melting point of 126.5–128° C.

*Example 3*

Tetra ethanol ammonium picrate was prepared by dissolving one mol of picric acid in absolute alcohol and reacting it with one mol of tetraethanol ammonium hydroxide (available commercially as a 56% solution). The reaction and purification followed the procedure of Example 1 with a product of yellow platelets of melting point 173–174.5° C.

The prepared tri-isopropanolamine picrate and triethanolamine picrate were dissolved in separate portions of triethylene glycol to provide the resistance data of the following table:

| Temp., ° C. | Tri-isopropanolamine picrate in triethylene glycol | | Triethanolamine picrate in triethylene glycol | |
|---|---|---|---|---|
| | Molar concentration | Resistance, ohms/centimeter cube | Molar concentration | Resistance, ohms/centimeter cube |
| 125 | .0024 | 6 ×10$^4$ | .001 | 8.8×10$^3$ |
| | .012 | 3.7×10$^3$ | .0024 | 1.8×10$^3$ |
| | .024 | 1.9×10$^3$ | .012 | 5.7×10$^3$ |
| | .049 | 1.2×10$^3$ | .024 | 6.9×10$^2$ |
| 150 | .0024 | 2 ×10$^4$ | .001 | 6.1×10$^3$ |
| | .012 | 2.7×10$^3$ | .0024 | 1.4×10$^3$ |
| | .024 | 1.4×10$^3$ | .012 | 4.3×10$^3$ |
| | .049 | 8.0×10$^2$ | .024 | 5.0×10$^2$ |
| 200 | .0024 | 7.3×10$^3$ | .001 | 3.8×10$^3$ |
| | .012 | 1.9×10$^3$ | .0024 | 9.0×10$^3$ |
| | .024 | 9.8×10$^2$ | .012 | 2.8×10$^2$ |
| | .049 | 6.5×10$^2$ | .024 | 3.4×10$^3$ |

*Example 4*

A two inch by six inch tantalum anode was formed to 100 volts in an electrolyte containing 100 grams of oxalic acid per liter of water. It was rolled into a capacitor with glass fiber paper as the porous spaced and a silver cathode. An impregnation electrolyte of 2 grams of tri-isopropanolamine picrate per 100 grams of triethylene glycol gave the following results:

| Temperature, ° C. | Leakage current, μa. | | Capacity, mfd. | Dissipation factor, percent |
|---|---|---|---|---|
| | 80 v. | 50 v. | | |
| 25 | | | 16.2 | 12.8 |
| 85 | 40 | 14.0 | | |
| 125 | 170 | 24.3 | | |
| 150 | 280 | 125 | | |
| 200 | 380 | 140 | 17.4 | 7.5 |

*Example 5*

A one and three-quarters inch by seven and three-quarters inch aluminum (99.99% pure) foil was formed to 600 volts in an electrolyte containing 120 grams boric acid per liter of water. It was rolled into a capacitor with glass fiber paper as the porous spacer and an aluminum cathode. An impregnation electrolyte of 2 grams of tri-isopropanolamine picrate per 100 grams of triethylene glycol gave the following results.

| Temperature, ° C. | Leakage current [1] μa, at 400 v. | Capacity, mfd. | Dissipation factor, percent |
|---|---|---|---|
| 25 | | 11.2 | 12 |
| 83 | 4.0 | | |
| 122 | 36 | | |
| 149 | 140 | | |
| 195 | 1,300 | 12.0 | 7.3 |

[1] Aged for 48 hours.

As many different embodiments of this invention may be made without departing from the spirit and scope hereof, it is to be understood that the invention is not limited to the specific embodiments hereof except as defined in the appended claims.

What I claim is:

1. An electrolytic capacitor including a film-forming electrode in contact with a body of electrolyte having a non-aqueous organic polar solvent in which is dissolved at a molar concentration of from 0.001 to 1, an organic amine salt of an acid selected from the class consisting of aromatic phenols and aromatic mercaptans where the aromatic grouping is substituted with at least one oxidizing radical and has filming properties with respect to the anode.

2. An electrolytic capacitor including a film-forming electrode in contact with a 0.001 to 1 molar solution of an organic amine salt of a nitro-substituted phenol in a non-aqueous polar organic solvent.

3. An electrolytic capacitor having a film-forming electrode in contact with a body of a 0.001 to 1 molar solution of an organic amine salt of a nitro-substituted phenol in a polyhydroxy aliphatic solvent.

4. An electrolytic capacitor having a film-forming electrode in contact with a body of a 0.001 to 1 molar solution of an organic amine salt of picric acid in a polyhydroxy aliphatic solvent.

5. An electrolytic capacitor having a film-forming electrode in contact with a 0.001 to 1 molar solution of an organic alkanol amine picrate in a solvent selected from the class of diethylene glycol and triethylene glycol.

References Cited in the file of this patent

UNITED STATES PATENTS

| | | |
|---|---|---|
| 2,274,807 | Rawlins et al. | Mar. 3, 1942 |
| 2,668,225 | Livingston | Feb. 2, 1954 |

FOREIGN PATENTS

| | | |
|---|---|---|
| 216,139 | Great Britain | Aug. 28, 1924 |

OTHER REFERENCES

Chem. Abstracts V34:26818 (1940), V34:9287 (1940).